US007464165B2

United States Patent
Vo et al.

(10) Patent No.: US 7,464,165 B2
(45) Date of Patent: Dec. 9, 2008

(54) SYSTEM AND METHOD FOR ALLOCATING RESOURCES ON A NETWORK

(75) Inventors: Patrick Tam Vo, Houston, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 11/002,545

(22) Filed: Dec. 2, 2004

(65) Prior Publication Data

US 2006/0123102 A1    Jun. 8, 2006

(51) Int. Cl.
    G06F 15/16    (2006.01)
(52) U.S. Cl. ............... 709/226; 709/218; 709/224; 709/225; 709/226; 709/238; 718/105
(58) Field of Classification Search ........ 709/218, 709/224, 225, 226, 238; 718/105
    See application file for complete search history.

(56) References Cited

U.S. PATENT DOCUMENTS

| | | | |
|---|---|---|---|
| 6,070,191 A * | 5/2000 | Narendran et al. ........ 709/226 |
| 6,185,623 B1 | 2/2001 | Bailey et al. | |
| 6,330,602 B1 * | 12/2001 | Law et al. ............... 709/224 |
| 6,718,359 B2 * | 4/2004 | Zisapel et al. ............ 718/105 |
| 6,728,718 B2 | 4/2004 | Banerjee et al. | |
| 6,813,635 B1 * | 11/2004 | Jorgenson .............. 709/225 |
| 7,155,515 B1 * | 12/2006 | Brown et al. ........... 709/226 |
| 7,284,067 B2 * | 10/2007 | Leigh ................... 709/238 |
| 7,287,090 B1 * | 10/2007 | Berg .................... 709/238 |
| 2003/0163341 A1 | 8/2003 | Banerjee et al. | |
| 2005/0188055 A1 * | 8/2005 | Saletore ................. 709/218 |

\* cited by examiner

*Primary Examiner*—Jinsong Hu
(74) *Attorney, Agent, or Firm*—Dillon & Yudell LLP

(57) ABSTRACT

A system and method for allocating resources on a network, including a server and at least one client. The resources are associated within a single set, such that the number of resources within the network can be easily incremented or decremented. Flags are associated with each resource, where the flags may be set to one of two states: a first state or a second state. When the server receives a connection request from a client, the server examines the flags associated with the resources to find a flag set to a second state. Upon finding a resource with a flag set to the second state, that resource is assigned to the client. Once the resource is assigned to a client, the associated flag is set to a first state and another flag associated with another resource is set to a second state.

1 Claim, 8 Drawing Sheets

LOAD BALANCE CONTAINER ~ 600 subnet      192.168.1.0 24 192.168.1~192.168.200 { ~ 602 exclude     192.168.1.1     # exclude default gateway ~ 604 exclude     192.168.101     # exclude default gateway ~ 606 exclude     192.168.1.5     # exclude dns ~ 608 exclude     192.168.1.6     # exclude dns ~ 610 balance - options { ~ 612

Option 6     192.168.1.5     # dns ~ 614

Option 6     192.168.1.6     # dns ~ 616

Option 3     192.168.1.1     # default gateway ~ 618

Option 3     192.168.1.101     # default gateway ~ 620 balance policy rotate ~ 622

Maximum fill-count 100; ~ 624

SYSTEM AND METHOD FOR ALLOCATING RESOURCES ON A NETWORK

BACKGROUND OF THE INVENTION

1. Technical Field

The present invention relates in general to data processing systems, and in particular, networked data processing systems. More particularly, the present invention relates to the management of a networked data processing system. Still more particularly, the present invention relates to the allocation of resources on a networked data processing system.

2. Description of the Related Art

Dynamic Host Configuration Protocol (DHCP) is a protocol for assigning a dynamic internet protocol (IP) address to devices on a network. With dynamic addressing, a device can have a different IP address each time it connects to a network. In some systems, the device's IP address can even change while it is still connected. In any case, when a computer system (i.e., a client system) attaches itself to the network for the first time, it broadcasts a DHCPDISCOVER packet. A DHCP server on the local segment will see the broadcast and return a DHCPOFFER packet that contains an IP address. Other information may also be included, such as which router and domain name server (DNS server) the client system should utilize when connecting to the DHCP server. A router is a device that connects several local area networks (LANs) together. A DNS server is a computer system that contains a program that translates domain names into IP addresses. DNS servers allow users to utilize domain names instead of IP addresses when communicating with other computer systems. An example of a domain name is www.ibm.com.

The client may receive multiple DHCPOFFER packets from any number of servers, so it must choose between them, and broadcast a DHCPREQUEST packet that identifies the explicit server and lease offer that it chooses. A lease is the amount of time an IP address can be allocated to a client system. The decision regarding which lease offer to choose may be based on which offer has the longest lease or provides the most information that the client system needs for optimal operation. If there are more client systems than IP addresses, using shorter leases can keep the server from running out of IP addresses. If there are more addresses than client systems, a permanent lease or a fixed IP address may be assigned to each client system.

The chosen server will return a DHCPACK that tells the client system that the lease is finalized. The other servers will know that their respective offers were not accepted by the client system when they see the explicit DHCPREQUEST packet. If the offer is no longer valid for any reason (e.g., due to a time-out or another client being allocated the lease), the selected server must respond with a DHCPNAK message. The client system will respond with another DHCPDISCOVER packet, which starts the process over again.

Once the client system receives a DHCPACK, all ownership and maintenance of the lease is the responsibility of the client. For example, a client system may refuse an offer that is detailed in the DHCPACK message, and it is the client's responsibility to do so. Client systems test the address that has been offered to them by conducting an address resolution protocol (ARP) broadcast. If another node responds to the ARP broadcast, the client system should assume that the offered address is being utilized. The client system should reject the offer by sending a DHCPDECLINE message to the offering server, and should also send another DHCPDISCOVER packet, which begins the process again.

Once the client system has the lease, it must be renewed prior to the lease expiration through another DHCPREQUEST message. If a client system finishes utilizing a lease prior to its expiration time, the client system is supposed to send a DHCPRELEASE message to the server so that the lease can be made available to other nodes. If the server does not receive a response from the client system by the end of the lease, it indicates the lease is non-renewed, and makes it available for other client systems to utilize in future connection requests.

Therefore, dynamic addressing simplifies network administration because the software keeps track of IP addresses rather than requiring an administrator to manage the task. This means that a new computer system can be added to a network without having to manually assign a unique IP address to a new system.

To assign IP addresses to the client systems, a DHCP server utilizes a configuration file. Stored in the configuration file is a range of IP addresses for each sub-network. This configuration file is utilized to construct a database that is referenced each time a DHCP server assigns an IP address to a client system. Associated with each range of IP addresses are options, such as a router or a DNS server. Therefore, when the DHCP server assigns an IP address from a particular range of addresses to a client system, it also specifies which router and DNS server the client should utilize. Depending on the number of active client systems in a sub-network, there may be times when a particular router and/or DNS server is overburdened with network traffic. When that occurs, the system administrator may want to load-balance to the network by associating a new router and/or DNS server with the range of IP addresses. Traditionally, the system administrator would have to modify the configuration file with the location information of the new router and/or DNS server.

As is well-known in the art, each time a configuration file is modified, the DHCP server has to be refreshed. During the time the DHCP server is refreshing, the DHCP server is off-line and cannot respond to any IP address requests. Also, while client systems that request IP addresses after the DHCP server has been refreshed will utilize a new router and/or DNS server, the client systems that were assigned IP addresses before the DHCP server was refreshed will continue to use the overburdened router and/or DNS server.

U.S. Patent Application Publication Number 2003/0163341, "Apparatus and Method of Dynamically Updating Dynamic Host Configuration Protocol (DHCP) Options," filed by IBM Corporation, the assignee of the present application, deals with this problem by storing the options in the configuration file in a special stanza that includes dynamic options and a frequency at which the options are to be updated. The options typically include a router and a DNS server that the client systems utilize when connecting to the network. Each time the options are updated, a different router and/or DNS server is utilized for subsequent client system transactions. The prior router and/or DNS server are removed from the dynamic stanza and not utilized in future client system transactions. While the referenced application solves the problem of requiring the DCHP server to be taken off-line each time the system administrator edits the configuration file by inserting the new options, the options are only updated at a preset time interval. This means that the system administrator must uniquely tailor the present time interval for updating the options so that each individual option is not overburdened. For example, if the system administrator sets a lengthy preset time interval, the options would not be updated frequently enough to prevent each option from becoming overburdened with network traffic.

Also well-known in the art is load-balancing of DHCP options via the utilization of virtual subnets. In the past, system administrators were required to divide a subnet (i.e. IP addresses the DHCP server may assign to incoming client systems) into virtual subnets and allocate the options among the virtual subnets. Therefore, whenever a client system was assigned an IP address by the DHCP server, the DHCP server also assigned the options related to that particular virtual subnet. However, in the event that there are more options added to the network, the system administrator would have to manually distribute the new options among the virtual subnets or redefine the ranges of the virtual subnets.

Therefore, there is a need for dynamically load-balancing DHCP network options without the need for refreshing the DHCP server and without the utilization of virtual subnets.

SUMMARY OF THE INVENTION

A system and method for allocating resources on a network, including a server and at least one client. The resources are associated within a single set, such that the number of resources within the network can be easily incremented or decremented. Flags are associated with each resource, where the flags may be set to one of two states: a first state or a second state. When the server receives a connection request from a client, the server examines the flags associated with the resources to find a flag set to a second state. Upon finding a resource with a flag set to the second state, that resource is assigned to the client. Once the resource is assigned to a client, the associated flag is set to a first state and another flag associated with another resource is set to a second state. Therefore, the system and method allows for network resources to be distributed equally among connecting clients without an explicit allocation of network resources and connection addresses by a systems administrator.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

FIG. 6 is a pseudocode representation of the load balance container in accordance with a preferred embodiment of the present invention.

DETAILED DESCRIPTION OF THE PREFERRED EMBODIMENT

This invention is described in a preferred embodiment in the following description with reference to the figures. While the invention is described in terms of the best mode for achieving this inventor's objectives, it will be appreciated by those skilled in the art that variations may be accomplished in view of these teachings without deviating from the spirit or scope of the present invention.

Figure 1:
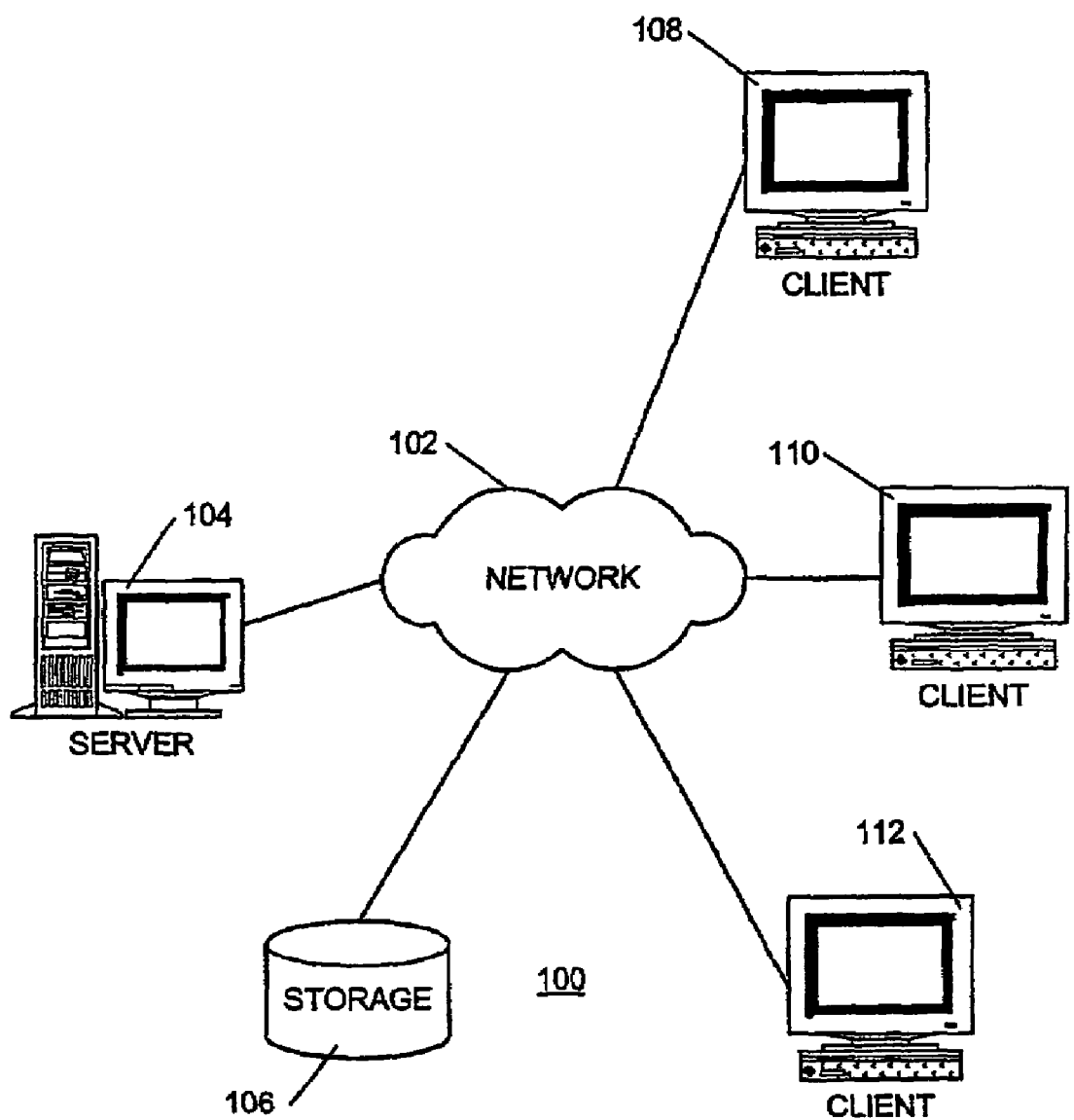
FIG. 1 is an exemplary block diagram depicting the data processing system in accordance with a preferred embodiment of the present invention.

Referring now to the figures, and in particular, with reference to FIG. 1, there is depicted an exemplary block diagram of a networked data processing system 100 in which the present invention may be implemented. Data processing system 100 includes a network 102. Network 102 is a collection of computers that communicate with each other through a system of interconnects. Examples of network 102 include wide-area networks (WANs), local-area networks (LANs), and the Internet. Data processing system 100 also includes a server 104, storage 106, and a collection of clients 108, 110, and 112 that periodically seek connections to server 104 via network 102. Data processing system 100 may include additional servers, clients, and peripherals not depicted in FIG. 1.

Figure 2:
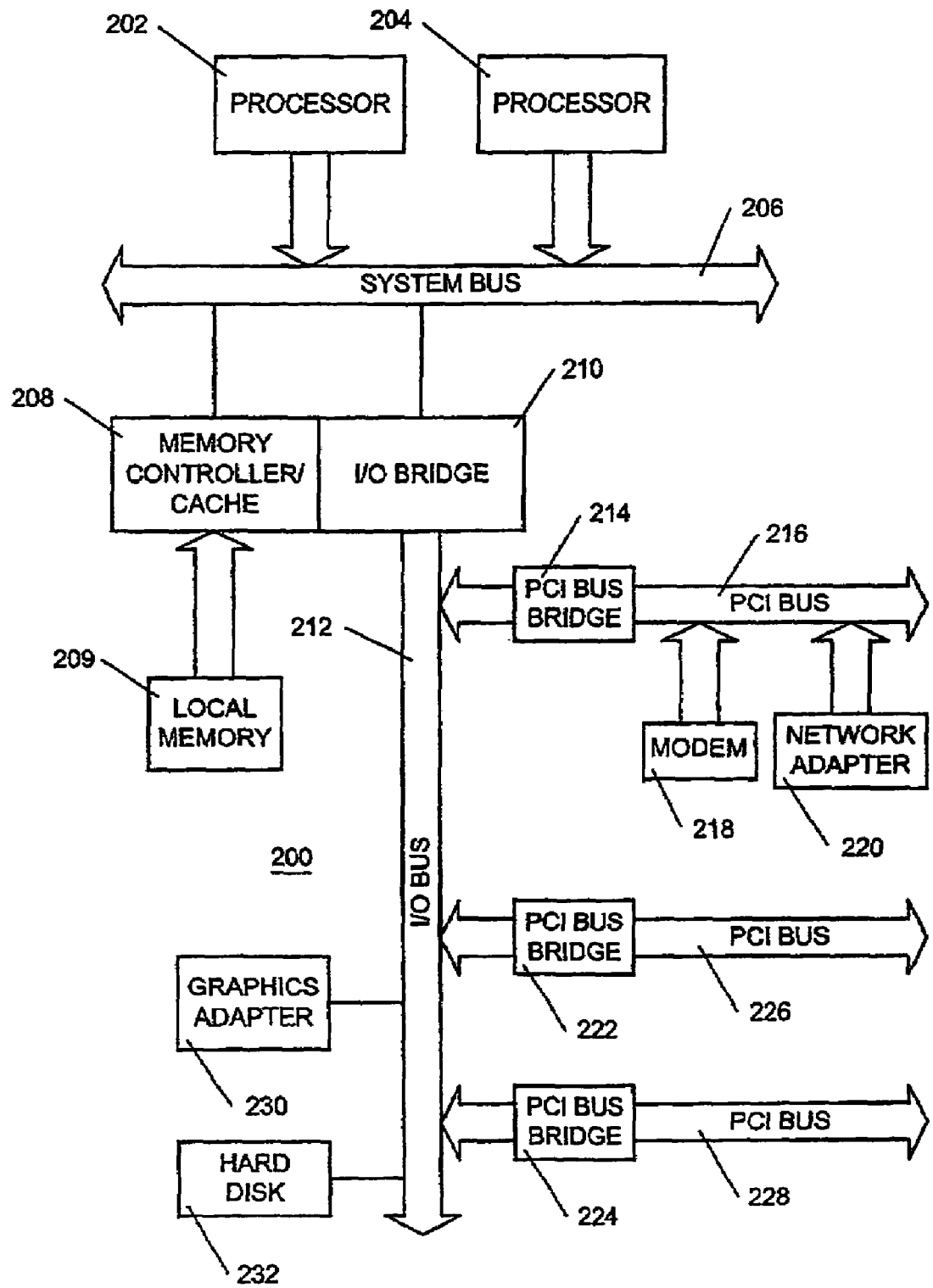
FIG. 2 is an exemplary block diagram illustrating a data processing system that may be implemented as a server in accordance with a preferred embodiment of the present invention.

Referring to FIG. 2, there is illustrated a block diagram of a data processing system 200 that may be implemented as a server, such as server 104 in FIG. 1, in accordance to a preferred embodiment of the present invention. Data processing system 200 may be a symmetric multiprocessor (SMP) system including a collection of processors 202 and 204, coupled to system bus 206. A single processor system may also be utilized. Also coupled to system bus 206 is memory controller/cache 208, which may be utilized as an interface to local memory 209. I/O bus bridge 210 is coupled to system bus 206 and provides an interface to I/O bus 212. Memory controller/cache 208 and I/O bus bridge 210 may be integrated as depicted, either indirectly or directly.

Peripheral component interconnect (PCI) bus bridge 214 coupled to I/O bus 212 provides an interface to PCI local bus 216. Communications links to network computers 108, 110, 112 in FIG. 1 may be provided through modem 218 and network adapter 220 coupled to PCI local bus 216 through add-in boards. Additional PCI bus bridges 222 and 224 provide interfaces for additional PCI local buses 226 and 228, from which additional network adapters or modems may be supported. Therefore, data processing system 200 allows connections to multiple network computers. A memory-mapped graphics adapter 230 and hard disk 232 may also be coupled to I/O bus as depicted, either directly or indirectly.

Those having ordinary skill in this art will note that the hardware depicted in FIG. 2 may vary depending on the configuration of data processing system 200. For example, other peripheral devices, such as additional disk drives, optical drives may be utilized in addition to or in the place of the hardware depicted. The example depicted in FIG. 2 is not meant to imply architectural limitations with respect to the present invention.

Figure 3:
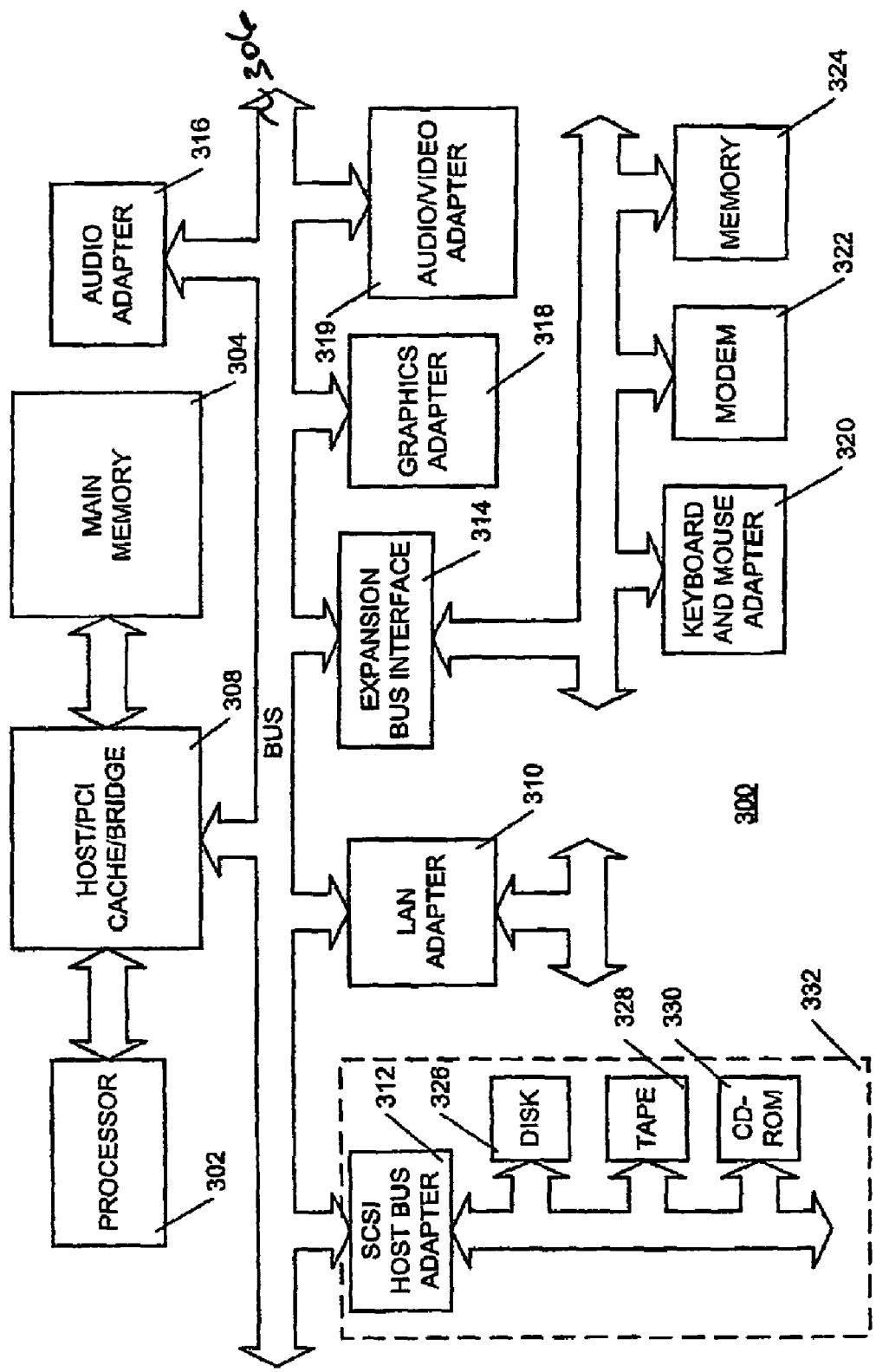
FIG. 3 is an exemplary block diagram depicting a data processing system that may be implemented as a client in accordance with a preferred embodiment of the present invention.

With reference to FIG. 3, a block diagram illustrating another data processing system is depicted in which the present invention may be implemented. Data processing system 300 is an example of a client computer. Data processing system 300 preferably employs a peripheral component interconnect (PCI) local bus architecture. Of course, those having ordinary skill in this art will appreciate that even though the depicted example employs a PCI bus, other bus architectures such as Accelerated Graphics Port (AGP) and Industry Standard Architecture (ISA) may also be utilized in the implementation. Processor 302 and main memory 304 are coupled to PCI local bus 306 via PCI bridge 308. PCI bridge 308 also may include an integrated memory controller and cache memory for processor 302. Additional connections to PCI local bus 306 may be made through direct component interconnection or via add-on boards. In the illustrated example, local area network (LAN) adapter 310, SCSI host bus adapter 312, and expansion bus interface 314 are coupled to PCI local bus 306 by direct component connection. In contrast, audio adapter 316, graphics adapter 318 and audio/video adapter 319 are coupled to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Preferably, an operating system runs on processor 302 and is utilized to coordinate and provide control of various components within data processing system 300. The operating system may be a commercially available operating system, such as Windows XP, with is available from Microsoft Corporation. Instructions for the operating system and applications are located on storage drives, such as hard disk drive 326, and may be loaded into main memory 304 for execution by processor 302.

Those having ordinary skill in this art will appreciate that the hardware in FIG. 3 may vary depending on the implementation. Other internal hardware or peripheral devices, such as non-volatile memory and optical disk drives may be utilized in addition to or in place of the hardware illustrated in FIG. 3. Also, the processes of the present invention may be applied to a multiprocessor data processing system.

As another example, data processing system 300 may be a stand-alone system configured to be bootable without relying on some type of network communication interface, whether or not data processing system 300 includes some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 may also be a kiosk or a web appliance.

The present invention involves a system and method for allocating multiple resources on a network to clients within that network. The invention may be local to client systems 108, 110, and 112 of FIG. 1 or to server 104 or to both server 104 and client systems 108, 110, and 112. Also, the present invention may be implemented on any storage medium, such as floppy disks, compact disks, hard disks, RAM, ROM, flash-ROM, and other computer-readable mediums.

Figure 4:
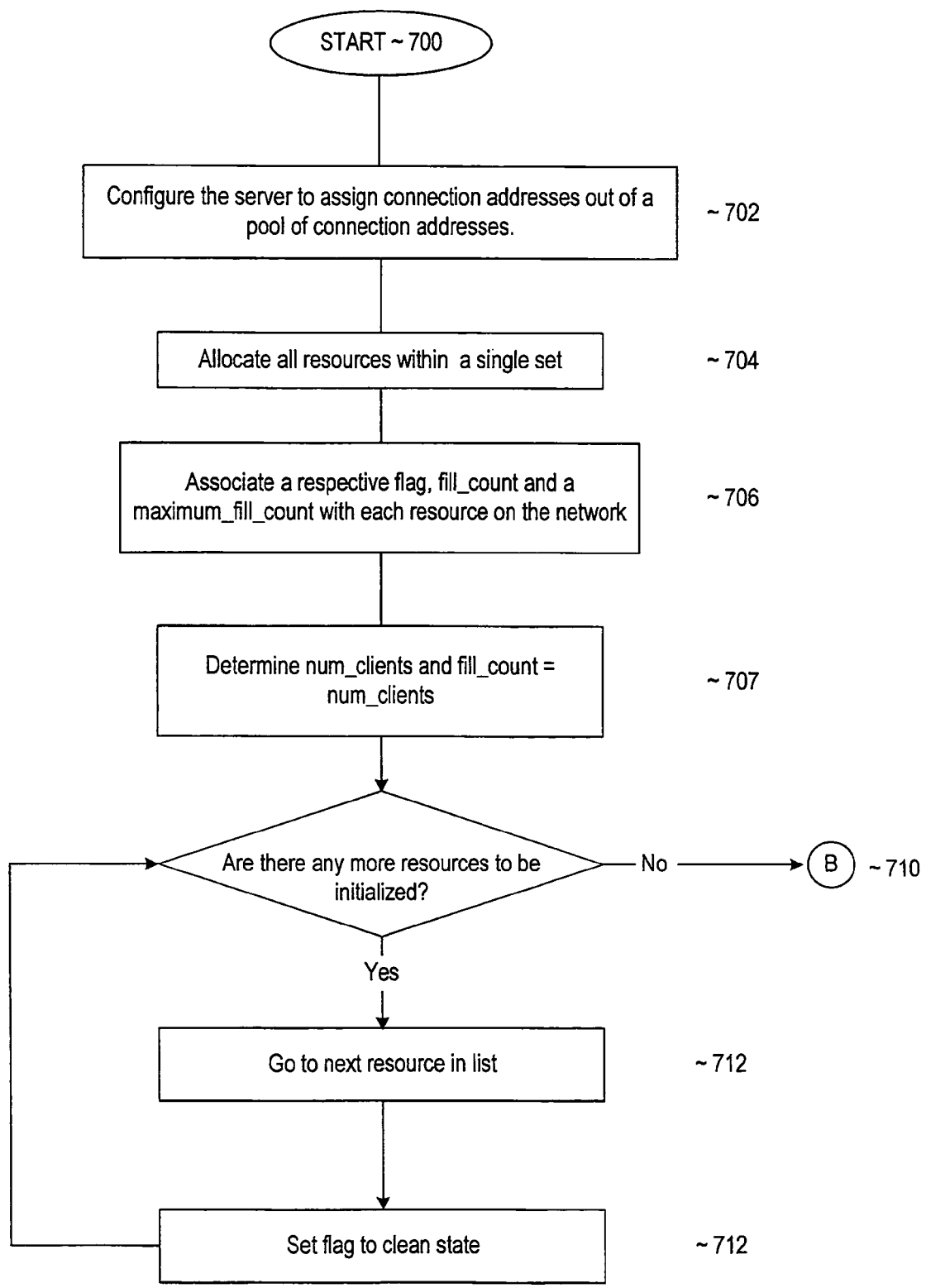
FIG. 4A is a high-level flowchart illustrating the initialization state of the method of allocating at least one resource to a client by a server in accordance with a preferred embodiment of the present invention.
FIG. 4B is a high-level flowchart illustrating the runtime state of the method of allocating at least one resource to a client by a server in accordance with a preferred embodiment of the present invention.

Referring now to the FIG. 4A, there is illustrated a high-level flowchart diagram of the initialization state of one preferred embodiment of the present invention. The process beings at step 700, and thereafter proceeds to step 702, which depicts the configuration of the server to assign connection addresses out of a pool of connection addresses. Then, the process continues to step 704, which illustrates the association of a respective flag, fill_count, and a maximum_fill_count with each resource on the network. Next, at step 706, the block depicts a determination made of the value of num_clients, or the number of clients currently utilizing each resource on the network. As illustrated in step 707, the value of fill_count for each resource is set equal to num_clients. Then, the process continues to step 708, which depicts a determination made of whether or not there are any more resources on the network to be initialized.

If it is determined that there are more resources to be initialized, the process proceeds to step 712, which illustrates moving to the next resource on the list. Then, as depicted in step 714, the flag associated with the resource is set to a clean state. The process then returns to prior block 708 and proceeds in an iterative fashion. If, however, it is determined that there are no more resources to be initialized, the process continues to step 710, which depicts the process continuing to step 710.

Figure 4B:
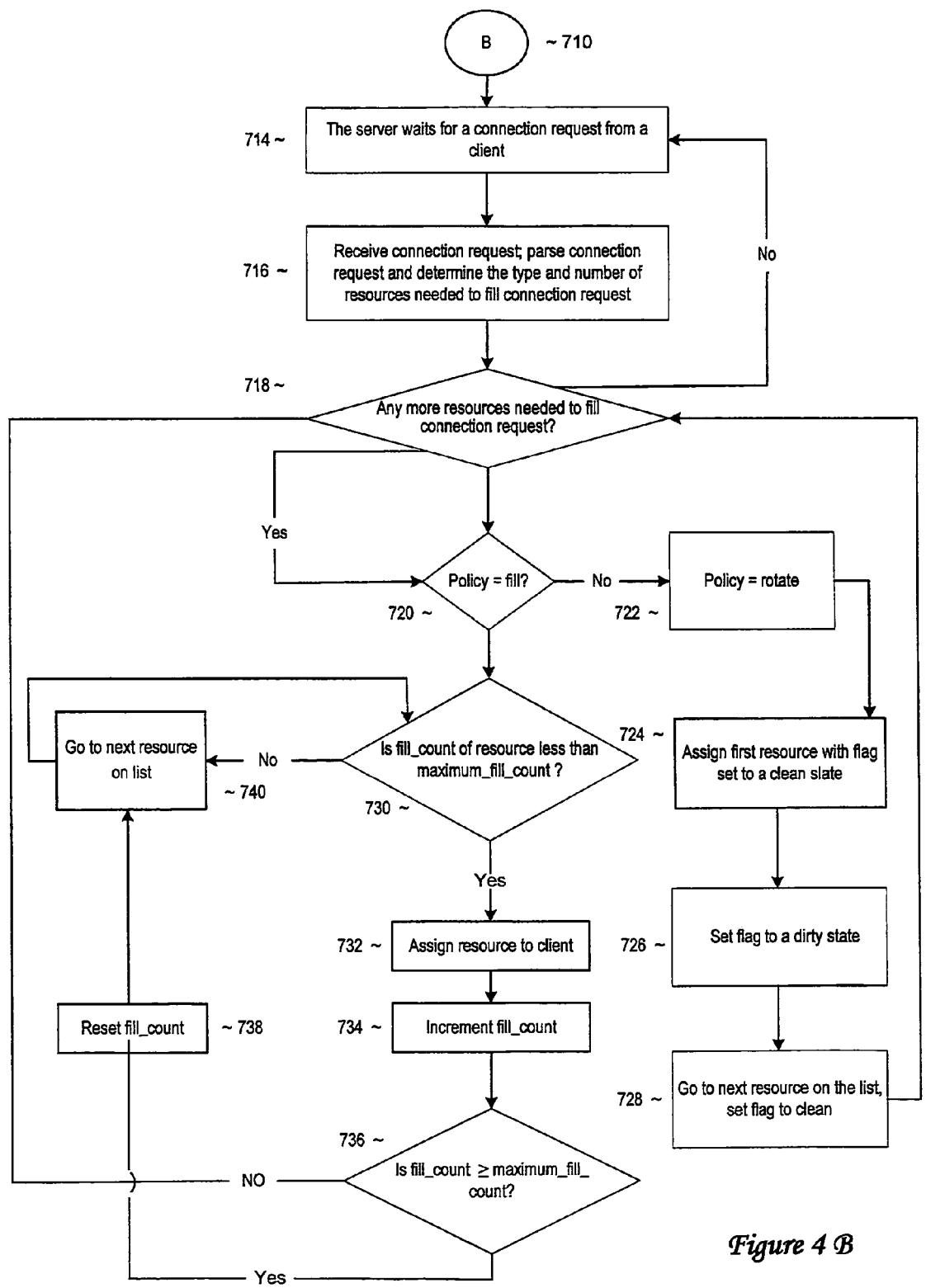

With reference to FIG. 4B, there is depicted a high-level flowchart diagram of the runtime state of the method according to one preferred embodiment of the present invention. The process begins at step 710, and thereafter proceeds to step 714, which depicts the server waiting for a connection request from a client. Then, the process continues to step 716, which illustrates the server receiving a connection request, parsing the connection request, and determining the type and number of resources needed to fill the connection request. Next, step 718 depicts a determination made as to whether or not any more resources are needed to fill the connection request. If it is determined that no more resources are needed, the connection request is considered filled, the process continues to prior step 714, and the process proceeds in an iterative fashion.

If more resources are needed to fill the connection request, step 720 illustrates a determination made of whether or not the current balance policy is set to fill. This determination is made by examining the balance_policy field 622 of FIG. 6. If it is determined that the current balance policy is set to fill, the process proceeds to step 730, which depicts a determination made of whether or not the fill_count of the resource is less than maximum_fill_count. If it is determined that the fill_count of the resource is not less than maximum_fill_count, the process proceeds to step 736, where the next resource in the list is examined. Then, the process continues to step 730 and proceeds in an iterative fashion.

If it is determined that the fill_count of the resource is less than maximum_fill_count, the process then proceeds to step 732, which depicts the assigning of the resource to the incoming client. Then, the fill_count is incremented, as illustrated in 734. Next, the process proceeds to step 736, which illustrates a determination of whether or not fill_count is greater than or equal to maximum_fill_count. If it is determined that fill_count is not greater than or equal to maximum_fill_count, the process returns to prior step 718 and proceeds in an iterative fashion. If fill_count is determined to be greater than or equal to maximum_fill_count, the process continues to step 738, which depicts the resetting of fill_count. Then, the process continues to step 740, which illustrates moving to the next resource on the list. Next, the process returns to prior step 730 and proceeds in an iterative fashion.

Returning to prior step 720, if it is determined that the current balance policy is not set to fill, the process then continues to step 722, which depicts the determination that the current balance policy is set to rotate. The process continues to step 724, which illustrates the assignment of the first resource with a flag set to a clean state to the client. Then, the process proceeds to step 726, which depicts setting the flag associated with the resource to a dirty state. Next, step 728 indicates setting the flag associated to the next resource on the list to a clean state. The procedure then returns to prior step 718 and continues in an iterative fashion.

In the prior preferred embodiment, the resources preferably are continually allocated to incoming clients no matter how burdened the resources on the network become. The traffic is balanced between the resources due to the various balance policies of fill or rotate. Those having ordinary skill in the art should appreciate that maximum_fill_count can be considered an absolute limit on the number of clients that may utilize a particular resource at one time. In another preferred embodiment of the present invention, the maximum_fill_count absolute limit holds all further client requests until the number of clients currently utilizing particular resources decrease due to expired or non-renewed connection leases.

Figure 5A:
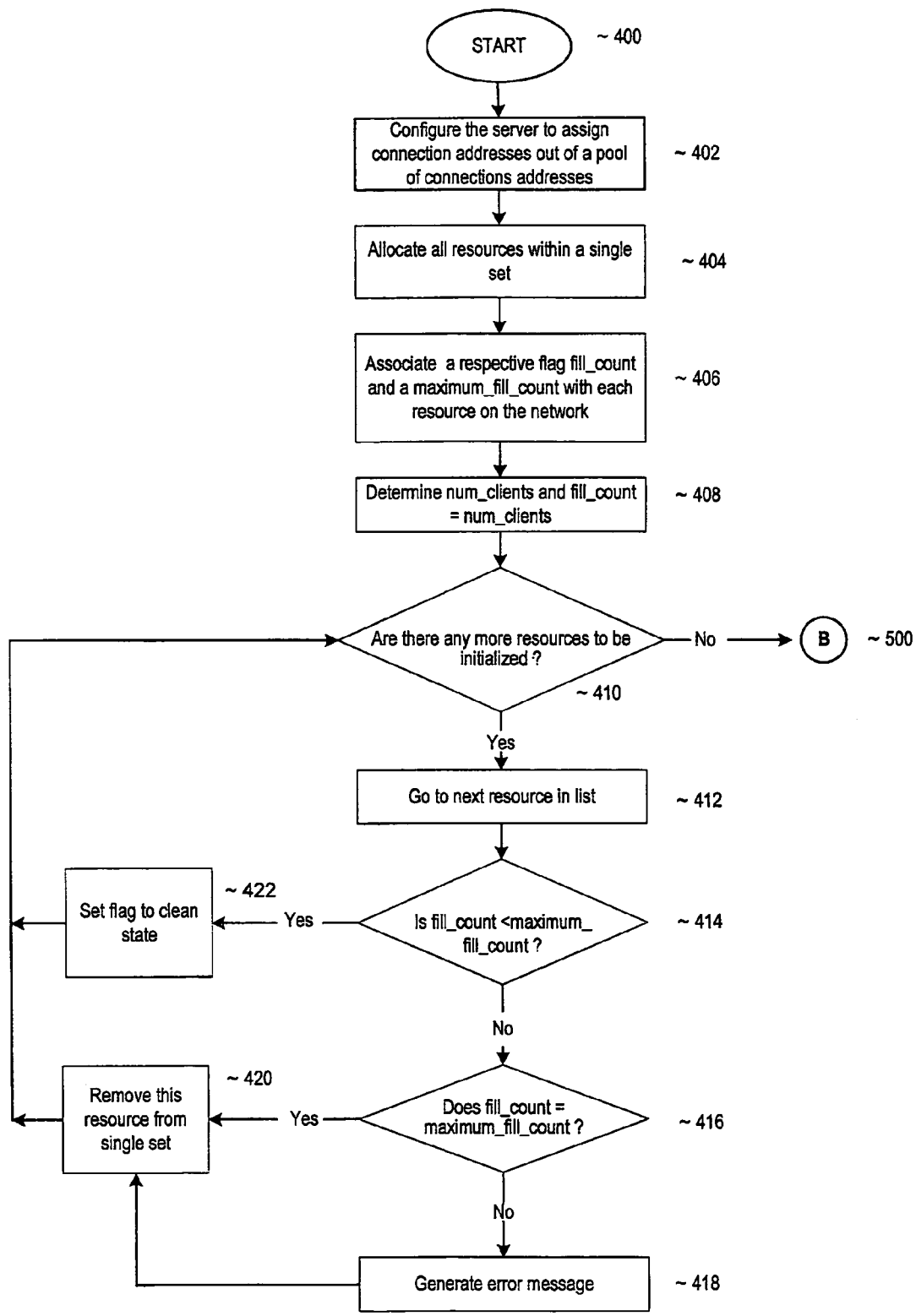
FIG. 5A is a high-level flowchart illustrating the initialization state of the method of allocating at least one resource to a client by a server in accordance with another preferred embodiment of the present invention.

Referring to FIG. 5A, there is illustrated a high-level flowchart diagram of the initialization state of another preferred embodiment of the present invention. The process begins at step 400 and thereafter proceeds to step 402, which depicts the configuration of a server to assign connection addresses out of a pool of connection addresses. The process then continues to step 404, which illustrates the association of a flag, a fill_count, and a maximum_fill_count with each resource on the network. Then, the process proceeds to step 408, which depicts a determination of the number of clients currently utilizing each resource on the network and assigning that number to the value of fill_count for each of the resources.

Figure 5B:
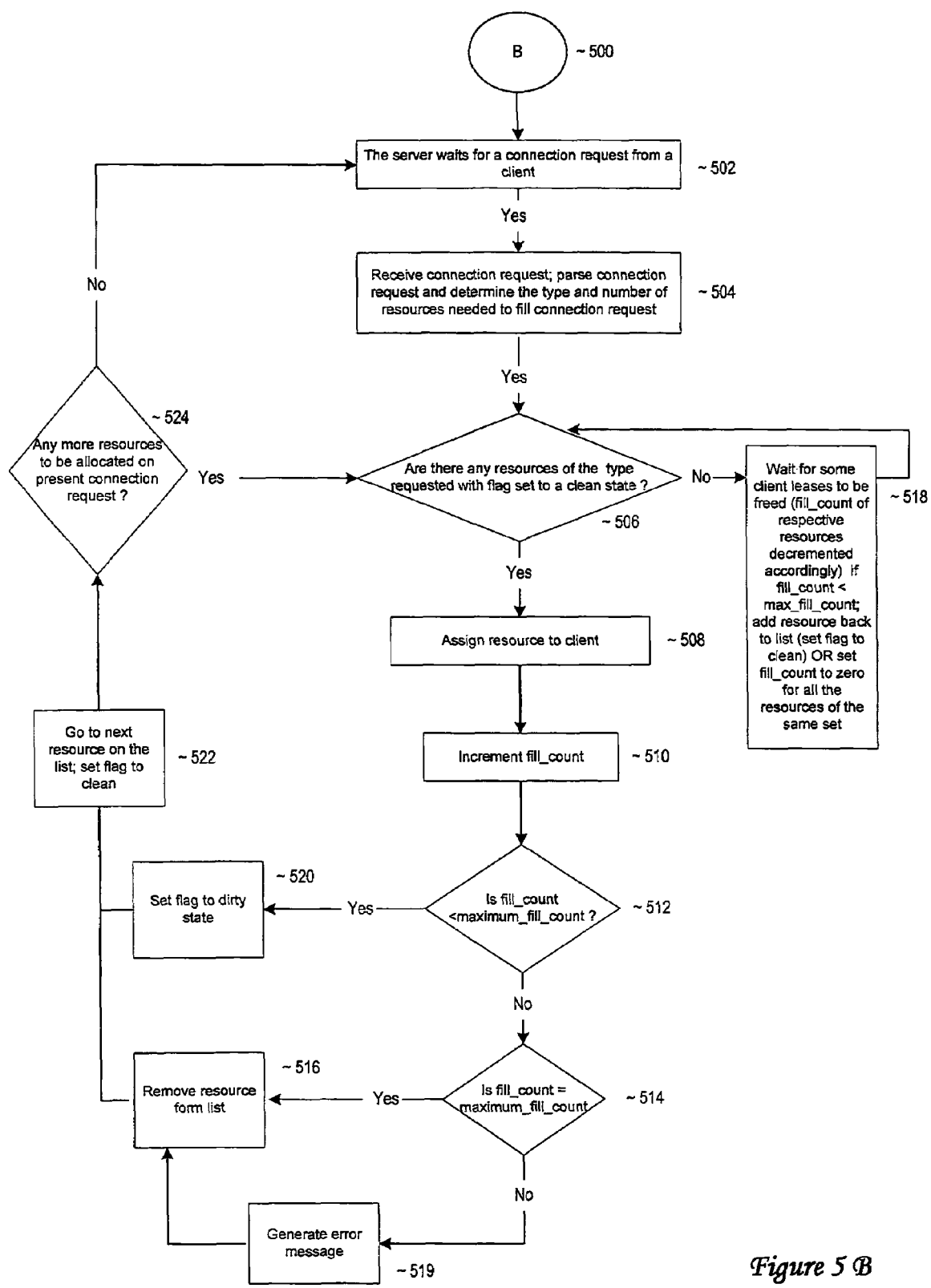
FIG. 5B is a high-level flowchart illustrating the runtime state of the method of allocating at least one resource to a client by a server in accordance with another preferred embodiment of the present invention.

The procedure then continues to step 410, which illustrates a determination made of whether or not there are any more resources to be initialized. If it is determined that there are no more resources to be initialized, the process moves to step 500, which illustrates the beginning of the runtime state, as depicted in FIG. 5B. If it is determined that there are more resources to be initialized, the process continues to step 412, which depicts moving to the next resource on the list. Then, the procedure transitions to step 414, which illustrates a determination made as to whether or not fill_count is less than maximum_fill_count. If fill_count is less than maximum_fill_count, the process continues to step 422, which indicates that the flag associated with the resource is set to a clean state. The process then returns to prior step 410 and proceeds in an iterative fashion.

Returning to step 414, if the determination is made that fill_count is not less than maximum_fill_count, the process continues to step 416, which depicts a determination made of whether or not fill_count is equal to maximum_fill_count. If it is determined that fill_count is equal to maximum_fill_count, the process proceeds to step 420, which depicts the removal of this resource from the single set. The process then returns to prior step 410 and proceeds in an iterative fashion. If it is determined that fill_count is not equal to maximum_fill_count, the process continues to step 418, which illustrates the generation of an error message. The error message preferably conveys to the systems administrator that the number of clients currently utilizing the particular resource has exceeded the value of maximum_fill_count and that the resource will be removed from the single set. The process then continues to prior step 420 and proceeds in an iterative fashion.

Those with ordinary skill in this art will appreciate that instead of removing the resource from the single set when a resource's maximum_fill_count has been reached, the resource may also be marked by the server in a way as to not allow client allocation to the resource until client utilization of the resource is reduced through the signing off of clients or the non-renewal of current client leases.

With reference to FIG. 5B, there is depicted a high-level flowchart diagram of the runtime state of another preferred embodiment of the present invention. The process continues from FIG. 5A at step 500 and proceeds thereafter at step 502, which depicts the server waiting for a connection request from a client. The procedure then proceeds to step 504, which illustrates the server receiving a connection request, parsing the connection request, and determining the type and number of resources needed to fill the connection request from the client. Then, the process continues to step 506, which depicts a determination made of whether or not there are any resources of the type requested with a flag set to a clean state. If a determination is made that there are not any available resources of the type requested with flag set to a clean state, the procedure moves to step 518, which illustrates a waiting state. During the waiting state, the server waits for some client leases to be freed and the fill_count of respective resources are decremented accordingly. If the fill_count is less than maximum_fill_count, the associated resource is added back to the list. The flag associated with the added resource is set to clean. Alternatively, if there are no resources of the type requested with the flag set to a clean state, the fill_count of all the resources of the type requested is set to zero, as depicted in step 518. This allows the resources to continue to be assigned to incoming clients, despite the fact that the resources have exceeded the pre-determined fill_count. The administrator may allow overburdened resources to be assigned to incoming clients because the network is configured to service incoming clients, no matter how burdened the resources have become. The process then moves back to the prior step 506 and continues in an iterative fashion.

Returning to step 506, if it is determined that there are resources of the type requested with the associated flag set to a clean state, the process moves to step 508, which depicts the assignment of the resource to the client. Then, the process continues to step 510, which illustrates the incrementing of fill_count to reflect the assignment of the client to the resource. Then, as depicted in step 512, a determination is made of whether or not fill_count is less than maximum_fill_count for the particular resource. If the fill_count is determined to be less than maximum_fill_count for the particular resource, the process continues to step 520, which illustrates the setting of the associated flag to a dirty state. The process then proceeds to step 522, which depicts moving to the next resource on the list and setting the associated flag to clean. Then, the process moves to step 524, which illustrates a determination of whether or not any more resources are to be allocated in the present connection request. If there are more resources to be allocated, the process returns to prior step 506 and proceeds in an iterative fashion. If there are no more resources to be allocated, the process returns to prior step 502 and continues in an iterative fashion.

Returning to step 512, if it is determined that fill_count is not less than maximum_fill_count, the process continues to step 514, which illustrates a determination made of whether or not fill_count is equal to maximum_fill_count. If fill_count is equal to maximum_fill_count, the process continues to step 516, which depicts the removal of the resource from the list. The procedure then returns to prior step 522 and continues in an iterative fashion. If, however, fill_count is not equal to maximum_fill_count, the process continues to step 519, which illustrates the generation of an error message. This error message preferably conveys to the system administrator that the particular resource has become overburdened, since fill_count has exceeded maximum_fill_count and that the resource will be removed from the list. The process then proceeds to prior step 516 and continues in an iterative fashion.

Now referring to FIG. 6, there is illustrated a pseudocode representation of the load balance container 600 according to a preferred embodiment of the present invention. Heading 602 indicates to the DHCP server the pool of IP addresses that the DHCP server may allocate to connection clients. In this example, the server may allocate any address between 192.168.1.0-192.168.1.200, or 200 unique IP addresses. Exclude statements 602, 604, 606, 608, and 610 are present to allow the options corresponding to those addresses to be placed in balance_options container 612.

DNS servers 614 and 616 are DNS servers that are available for allocation. In a preferred embodiment of the present invention, the server examines balance_policy 622 to determine how to assign the incoming clients to the various available resources. If balance_policy 622 is set to fill, clients are allocated to each resource in the list until the fill_count associated with the resource has reached maximum_fill_count. Then, the cycle is repeated with the next resource on the list. If balance_policy 622 is set to rotate, clients are balanced to each resource on the list by order of assignment. For example, assume that the balance_options container 612 merely contains three options: O1, O2, and O3. The first incoming client would be assigned to O1, the second to O2, the third to O3, and the procedure will assign the fourth to O1.

In another preferred embodiment of the present invention, when a first client sends a connection request, DNS server 614 is utilized. Then, as detailed in FIG. 5, the flag in DNS server 614 is set to a first (dirty) state, so that DNS server 616 will be allocated when a second client sends a connection request to the DHCP server. The same scheme is applied to default gateways 618 and 620. This algorithm allows load balancing of the DHCP options until the fill_count of each DHCP option reaches the maximum_fill_count 624 of one-hundred clients. Finally, balance_policy 622 set to rotate indicates to the DHCP server that the options on the network should be load balanced, or that the options should be allocated to client systems in a round-robin fashion.

While load_balance container 612 has been particularly shown as described as a computer program product residing in the memory of at least one component of the networked data processing system, ones skilled in the art can appreciate that load_balance container 612 may be implemented by physical circuitry residing on one or more components of the networked data processing system. Also, according to a preferred embodiment of the present invention, load_balance container 612 is implemented in volatile memory of the networked data processing system. However, load_balance container 612 may also be implemented in non-volatile memory, optical disk storage, hard disk drives, floppy drives, and any other type of volatile and non-volatile memory storage device.

While this invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for load balancing on a network without setting up virtual subnets, wherein said network includes at least a server, one or more clients, and a plurality of return options, said method comprising:
   allocating a plurality of sets of return options in a container, wherein each of said plurality of sets includes a plurality of return options, all return options in a same set are of a same type, and return options in at least two sets are of different types, and wherein each of the plurality of return options specifies control information for communication on the network by the client; and
   assigning a collection of return options to a client among the one or more clients on the network by reference to the container, wherein said collection of return options includes at least one return option from each of said plurality of sets of return options in the container, wherein each of said return options has a respective associated value representing a maximum number of clients that may be assigned to each of said return options and wherein said assigning further includes:
      repeatedly assigning a first return option out of each of said plurality of sets in response to requests by the one or more clients until said value associated with the first return option is reached; and
      in response to reaching the value associated with the first return option, assigning another return option out of each of said plurality of sets in response to requests by the one or more clients.

* * * * *